United States Patent [19]

Hartman

[11] Patent Number: 4,818,104
[45] Date of Patent: Apr. 4, 1989

[54] REMOTE ANGLE MEASUREMENT—ESPECIALLY MISSILE YAW MEASUREMENT

[75] Inventor: Richard L. Hartman, Huntsville, Ala.

[73] Assignee: The United States of America as represented by the Secretary of the Army, Washington, D.C.

[21] Appl. No.: 104,464

[22] Filed: Oct. 5, 1987

[51] Int. Cl.$^4$ .............................................. G01B 11/26
[52] U.S. Cl. ..................................... 356/138; 350/167
[58] Field of Search ............... 356/138, 153, 397, 401; 350/167; 340/953, 955, 958

[56] References Cited

U.S. PATENT DOCUMENTS 3,468,545  9/1969  Anderson .............................. 350/167
3,495,908  2/1970  Rea ........................................ 350/167
3,873,210  3/1975  Konopka ............................. 356/138
3,885,876  5/1975  Konopka ............................. 356/153

Primary Examiner—F. L. Evans
Attorney, Agent, or Firm—Freddie M. Bush

[57] ABSTRACT

Remote measurement of an angle is very difficult if the angle to be measured is in the plane containing the observer. This is accomplished by using cylindrical lenses and patterns which provide a binary coded image to the remote observer. The binary code represents the angle in the plane containing the observer. Use of microscreens allows the system to be very thin, and even curved around a curved surface, such as a missile. It continuously records an angle of a missile during test flight.

12 Claims, 3 Drawing Sheets

REMOTE ANGLE MEASUREMENT—ESPECIALLY MISSILE YAW MEASUREMENT

DEDICATORY CLAUSE

The invention described herein may be manufactured, used, and licensed by or for the Government for governmental purposes without the payment to me of any royalties thereon.

BACKGROUND OF THE INVENTION

There is no simple prior art for measuring an angle in the plane containing the observer, hereafter referred to as the "yaw" angle. In missile testing this is one of the principal variables of interest. One current technique is to hoist a camera far above the missile launch, looking downward. Then the viewing perspective is perpendicular to the angle of interest, and it can be measured with a protractor on the film or video tape. This is restricted to the launch phase of the flight.

Another known invention utilizes a pair of laser trackers illuminating roof reflectors on the missile, which must be rolling, and determines the yaw angle from the differential time of arrival of the signal at different sites. While this idea works in principal, the cost of multiple tracking stations has kept implementation out of reach.

It may be possible to determine the yaw angle by continuous doppler measurement of retroreflectors placed on different part of the missile. Again, they require instrumentation more complex than is normally found on the range, and measure angular rate, rather than position. Therefore a continous track is necessary to deduce angular position.

SUMMARY OF THE INVENTION

Remote measuring of an angle is very difficult if the angle to be measured is in the plane containing the observer. This invention comprises a device using cylindrical lenses and patterns which provide a binary coded image to the remote observer. The binary code read out is the angle in the plane containing the observer. Use of microscreens allows the system to be very thin, and even curved around a curved surface, such as a missile. It can be used to continuously record the yaw angle of a missile during test flight.

BRIEF DESCRIPTION OF THE DRAWINGS

The invention will now be described with reference to the attached drawings, in which.

DETAILED DESCRIPTION OF THE PREFERRED EMBODIMENTS

Figure 1:
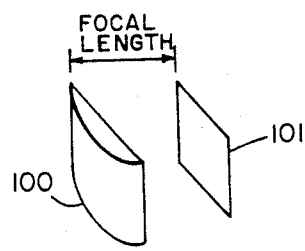
FIG. 1 is a perspective view of the lens of the invention.
Figure 2:
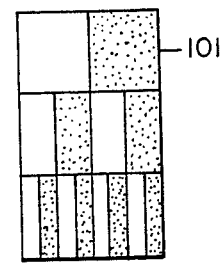
FIG. 2 is a plan view of the target pattern.

This invention uses a cylindrical lens 100 located one focal length away from a special target pattern 101 as shown in FIG. 1. The target pattern is shown in FIG. 2. The number of sections in the pattern depends on the desired resolution.

Figure 3:
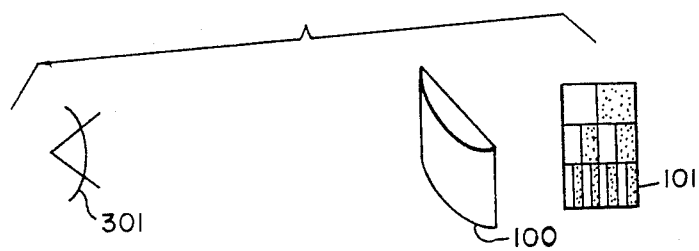
FIG. 3 is a schematic perspective view of the lens-target-pattern system of the invention.

The lens-target-pattern system is observed by a remote observer 301 as in FIG. 3 and is more easily recorded in real time with movie film or TV. The pattern which the observer sees varies with the yaw angle, and so is a measurement of the yaw angle. For the target pattern shown in FIG. 2 this is a binary encoding of the angle.

Figure 4:
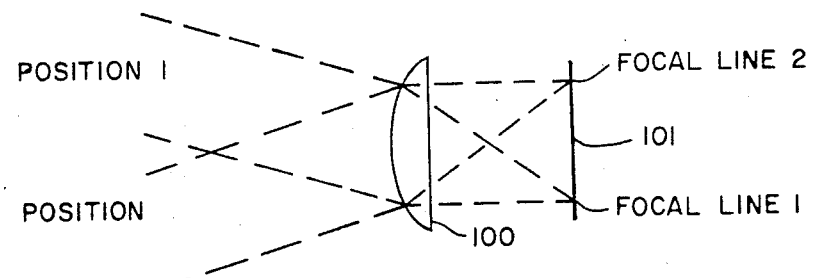
FIG. 4 is a top plan view of the system illustrated in FIG. 3.
Figure 5:
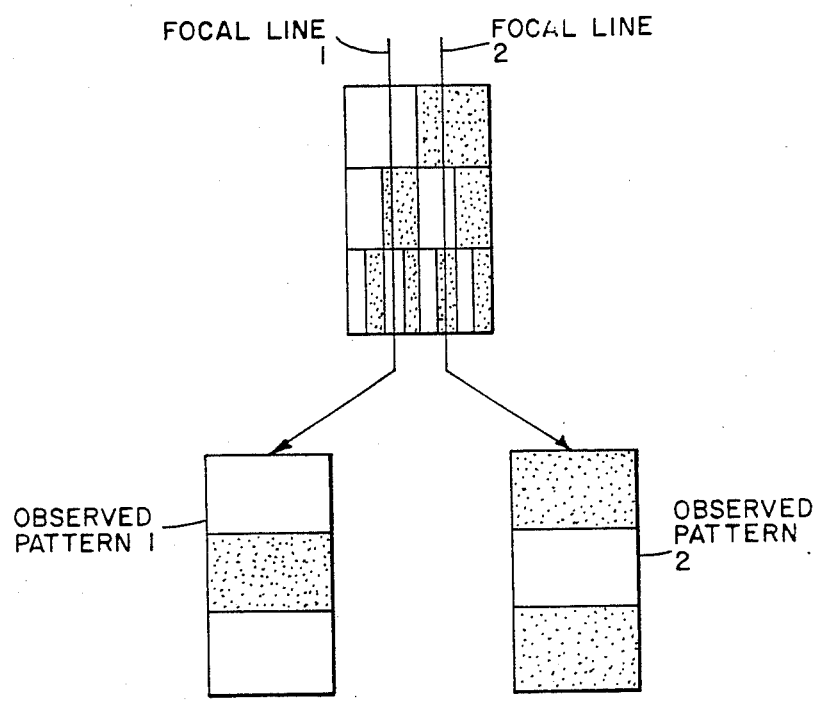
FIG. 5 is a schematic illustration of the pattern, as observed in the system of FIG. 3.

The cylindrical lens has the property that collimated light forms a focal line, rather than a focal spot. Conversely, a remote observer sees the aperture of the lens as filled with the information contained in the focal line. The location of the focal line in the focal plane depends on the angle to the observer, as shown in FIG. 4 and FIG. 5. FIG. 4 is a top view and the focal lines extend perpendicular into and out of the paper.

For the target pattern of FIG. 2, the observed pattern is a binary encoded representation of the yaw angle (or the angle of orientation in the plane containing the observer), as shown in FIG. 5.

Figure 6:
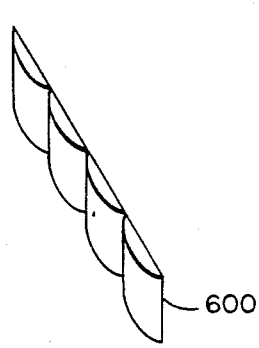
FIG. 6 is a perspective view of an array of cylindrical lenses in accordance with the invention.
Figure 7:
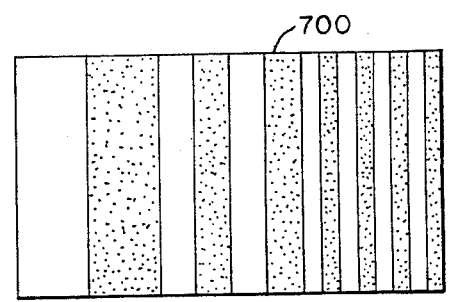
FIG. 7 is a side-by-side plan view of an array of different size bars as a target pattern.
Figure 8:
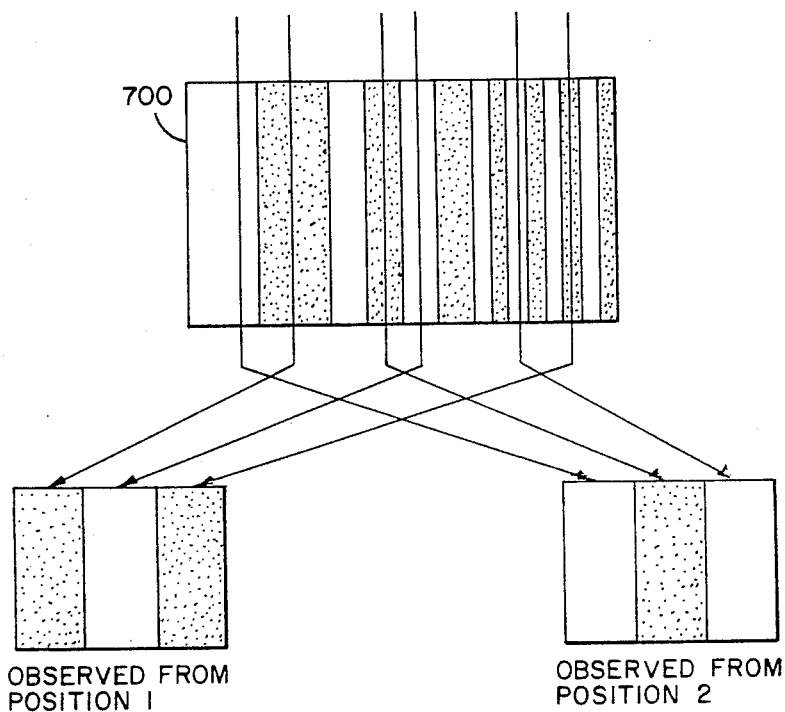
FIG. 8 is an illustration of the observed pattern of the target illustrated in FIG. 7.

A modification of the target pattern can be used with an array of cylindrical lenses 600, as shown in FIG. 6. In this case, the target pattern 700 is a side by side array of the different size bars, as shown in FIG. 7, and the resultant observed pattern in a horizontal coding of the angle, as in FIG. 8. FIG. 8 assumes only a three lense array.

Figure 11:
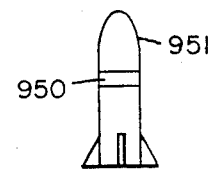
FIG. 11 is a front view of a missile to which the lens and target of the invention is attached.

The reason for considering this version is that in many cases, such as a missile test flight, a large lens many centimeters from the target is impractical. But arrays of lenses are now available formed into very thin sheets. Such a sheet 950 can be wrapped around the missile 951 (see FIG. 11), and if the missile is rolling, the horizontal coding would stay constant as long as the yaw angle stayed constant, whereas the vertical coding would change with time.

Figure 9:
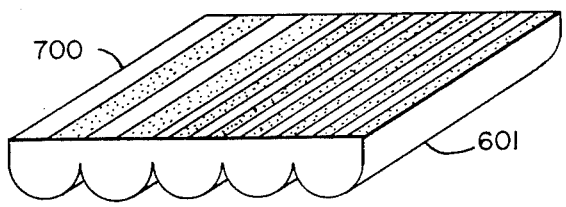
FIG. 9 is a perspective view of a modification of a lens of the invention wherein the target and the lens are combined.

The lenses 601 should be made so small that the focal plane is the back plane of the thickness of the material. The pattern 700 would be painted on the back side, as in FIG. 9. In one millimeter thick material, such lenses would be about 1 millimeter wide. To measure to an angular accuracy of 1 degree over a 100 degree field of view would require 50 bars in the 1 millimeter spacing for the highest resolution part. This is easily achieved by photographic means, and is a factor of 100 cruder than is currently practiced in integrated circuit manufacture. Since the remote observer probably won't be able to resolve a 1 millimeter feature, many adjacent lenslets would be focused on similar portions of the pattern. If each bit of the binary code was 1 cm wide, the total code for 1 degree would be 6 cm wide.

The entire target screen could be made with just the highest resolution needed, and the system used as an angular rate measurer. It could deduce angle from integrating a continuous track.

With laser tracking of a rolling missile, the data collection could be automated by using the vertical pattern of FIG. 2. Due to the nature of cylindrical lenses, there would be retroreflection only from a narrow strip down the observed center of the curved missile body. This retroflection would be a time encoding of the yaw angle. This could require some kind of wider all-reflecting pulse, or array of pulses, to indicate the start time of the code sequence. The missile would have to roll though a sufficient angle without the yaw changing appreciably. However, the vertical extent of each segment of the pattern could be very small, so not much total roll would be needed.

Figure 10:
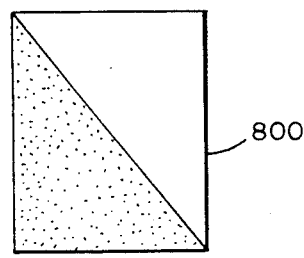
FIG. 10 is a plan view of a modification of the target pattern.

An analog version of this concept work with the target pattern 800 of FIG. 10, if the target can be flat. In this case, the location of the black/white interface is a measurement of the angle.

The back of the screen-target combination could be precoded with adhesive, so that it could be just stuck on.

There are many applications outside the realm of missile testing, for example:

(a) Automatic detection of the orientation of parts in automated manufacturing.

(b) Approach angle detection and control for docking of spacecraft.

(c) Measuring, for control, the angles between various members of a large extended space station.

(d) Navigation aids.

I claim:

1. Apparatus for measuring the orientation of an elongated body within a first plane which extends through the longitudinal axis of said elongated body and the angle of deviation of the longitudinal axis of said body from a second plane which is transverse to said first plane, and which intersects said longitudinal axis comprising:
   (a) a coded pattern disposed on said longitudinal body for indicating the angle at which the longitudinal axis of said body intersects said second plane; and
   (b) cylindrical lens means disposed on said elongated body, one focal length away from said coded pattern for focusing on different portions of said coded pattern when observed to indicate the angle at which said longitudinal axis intersects said second plane.

2. Apparatus as set forth in claim 1, wherein said coded pattern is printed on one side of said lens means.

3. Apparatus as set forth in claim 1, wherein said cylindrical lens means comprises a plurality of lenses arranged side-by-side.

4. Apparatus as set forth in claim 3, wherein said coded pattern is of a size such that it extends across the focal planes of all of said cylindrical lenses,.

5. Apparatus as set forth in claim 4, wherein each of said lenses has a flat side which is located at the focal plane of said lenses and said coded pattern is printed across said flat sides.

6. Apparatus as set forth in claim 1, wherein said elongated body is a missile and said coded pattern and cylindrical lens means are disposed in a band about a portion of said missile.

7. Apparatus for indicating the orientation of an elongated surface within a first plane which extends through the longitudinal axis of said surface and the angle of deviation of said longitudinal axis of said surface from a second plane which is transverse to said first plane and which intersects said longitudinal axis, comprising:
   (a) a coded pattern disposed on said elongated surface for indicating the angle at which the longitudinal axis of said surface intersects said second plane; and
   (b) cylindrical lens means disposed on said elongated surface, one focal length away from said coded pattern for focusing on different portions of said coded pattern when observed, to indicate the angle at which said longitudinal axis intersects said second plane.

8. Apparatus as set forth in claim 7, wherein said coded pattern is printed on one side of said lens means.

9. Apparatus as set forth in claim 7, wherein said cylindrical lens means comprise a plurality of lenses arranged side-by-side.

10. Apparatus as set forth in claim 9, wherein said coded pattern is of a size such that it extends across the focal planes of all of said cylindrical lenses.

11. Apparatus as set forth in claim 10 wherein each of said lenses has a flat side which is located at the focal plane of said lenses and said coded pattern is printed across said flat sides.

12. Apparatus as set forth in claim 7, wherein said elongated body is a missile and said coded pattern and cylindrical lens means are disposed in a band about a portion of said missile.

* * * * *